(12) United States Patent
Tang et al.

(10) Patent No.: US 10,271,395 B2
(45) Date of Patent: Apr. 23, 2019

(54) SMART LED LIGHTING DEVICE AND SYSTEM THEREOF

(71) Applicant: ZHEJIANG SHENGHUI LIGHTING CO., LTD, Jiaxing (CN)

(72) Inventors: Shumin Tang, Jiaxing (CN); Shuyu Cao, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 265 days.

(21) Appl. No.: 14/899,836

(22) PCT Filed: Apr. 28, 2015

(86) PCT No.: PCT/CN2015/077645
§ 371 (c)(1),
(2) Date: Dec. 18, 2015

(87) PCT Pub. No.: WO2016/015499
PCT Pub. Date: Feb. 4, 2016

(65) Prior Publication Data
US 2016/0205362 A1   Jul. 14, 2016

(30) Foreign Application Priority Data
Jul. 29, 2014  (CN) .......................... 2014 1 0367840

(51) Int. Cl.
  H04N 9/31       (2006.01)
  H04M 1/725    (2006.01)
  H05B 33/08    (2006.01)
(52) U.S. Cl.
  CPC ...... H05B 33/0845 (2013.01); H04M 1/7253 (2013.01); H04N 9/3173 (2013.01);
(Continued)

(58) Field of Classification Search
  CPC .................................................. H04N 5/23206
(Continued)

(56) References Cited

U.S. PATENT DOCUMENTS 6,151,490 A  * 11/2000  Schultheiss ........... H04M 1/725
                                                         348/E5.103
6,219,110 B1 *  4/2001  Ishikawa .............. H04N 5/7458
                                                         348/759
(Continued)

FOREIGN PATENT DOCUMENTS

CN         202040636 U      11/2011
CN         202266962 U       6/2012
(Continued)

OTHER PUBLICATIONS

The World Intellectual Property Organization (WIPO) International Search Report for PCT/CN2015/077645 dated Aug. 3, 2015.

*Primary Examiner* — Paulos M Natnael
(74) *Attorney, Agent, or Firm* — Anova Law Group, PLLC

(57) ABSTRACT

The present disclosure provides a smart LED lighting device, including an LED light-emitting unit, an LED power supply unit, a wireless unit configured to send and receive video data, a video processing and controller unit configured to transmit analyzed and processed video data to a projection unit, a projection unit configured to receive and transmit the video data to a lens unit, and a lens unit configured to project produced video data onto a screen. The present disclosure also provides a smart LED lighting system using the smart LED lighting device. The present disclosure provides lighting as well as projection functions, allowing full integration of lighting control and video projection. A wireless communication unit is used to facilitate networking so that online videos can be projected remotely. The disclosed lighting (Continued)

device can also act as a router to provide internet access to connected devices, enhancing user experience.

19 Claims, 1 Drawing Sheet

(52) U.S. Cl.
CPC ....... *H05B 33/0803* (2013.01); *H05B 33/086* (2013.01); *H04M 2250/54* (2013.01)

(58) Field of Classification Search
USPC ....... 348/552, 553, 558, 567, 569, 523, 636, 348/656, 680, 693, 706, 715, 716, 719, 348/725, 729, 739, 744, 761, 786, 333.13, 348/360, 372, 376, 208.16, 211.2, 224.1, 348/231.1, 231.9, 247, 158, 69, 14.02, 348/801, 838, 441; 362/20, 23.07, 169, 362/192, 215, 249.02, 268, 296.03, 362/311.02, 311.05, 545, 555, 577, 800; 455/3.01, 41.2, 91, 127.1, 127.5, 402, 455/522, 554.1, 572; 725/61, 109, 110, 725/133
See application file for complete search history.

(56) References Cited

U.S. PATENT DOCUMENTS

| | | | | |
|---|---|---|---|---|
| 6,474,839 | B1* | 11/2002 | Hutchison | G08G 1/095 362/235 |
| 6,614,358 | B1* | 9/2003 | Hutchison | G08G 1/095 340/815.4 |
| 8,812,368 | B1* | 8/2014 | Gazdzinski | A61B 1/00016 705/21 |
| 8,994,276 | B2* | 3/2015 | Recker | H02J 9/02 315/160 |
| 8,994,800 | B2* | 3/2015 | Brockway, III | H04N 5/23206 348/61 |
| 9,025,014 | B2* | 5/2015 | Brockway, III | H04L 12/2803 348/61 |
| 9,036,016 | B2* | 5/2015 | Brockway, III | H04N 1/00315 348/61 |
| 9,990,175 | B2* | 6/2018 | Zhang | G10L 15/26 |
| 2005/0099319 | A1* | 5/2005 | Hutchison | G08G 1/095 340/908 |
| 2008/0113618 | A1* | 5/2008 | De Leon | H04W 12/04 455/41.2 |
| 2008/0167523 | A1* | 7/2008 | Uchiyama | A61B 1/00036 600/114 |
| 2008/0188306 | A1* | 8/2008 | Tetterington | A63F 13/06 463/37 |
| 2008/0310038 | A1* | 12/2008 | Tanaka | G03B 3/12 359/823 |
| 2009/0207322 | A1* | 8/2009 | Mizuuchi | G03B 21/14 348/745 |
| 2010/0034328 | A1* | 2/2010 | Jin | H03G 1/0088 375/346 |
| 2010/0045567 | A1* | 2/2010 | Lin | G06F 3/1454 345/1.1 |
| 2010/0299709 | A1* | 11/2010 | O'Connor | H04N 7/163 725/61 |
| 2010/0309390 | A1* | 12/2010 | Plut | H04N 9/3147 348/744 |
| 2011/0001933 | A1* | 1/2011 | Jiang | G03B 21/56 353/15 |
| 2011/0291942 | A1* | 12/2011 | Chen | G06F 3/0489 345/172 |
| 2012/0146809 | A1* | 6/2012 | Oh | G07C 5/085 340/901 |
| 2013/0044488 | A1 | 2/2013 | Hreish | |
| 2013/0286359 | A1* | 10/2013 | Motoya | F21V 9/08 353/31 |
| 2013/0343601 | A1* | 12/2013 | Jia | G06K 9/00355 382/103 |
| 2014/0006953 | A1* | 1/2014 | Kim | H04L 12/282 715/727 |
| 2014/0049493 | A1* | 2/2014 | Nojima | G09G 5/006 345/173 |
| 2014/0157339 | A1* | 6/2014 | Zhang | H04N 21/4126 725/110 |
| 2014/0198949 | A1* | 7/2014 | Garlington | G03B 21/10 382/103 |
| 2014/0330928 | A1* | 11/2014 | Takehara | H04L 67/1095 709/217 |
| 2015/0062436 | A1* | 3/2015 | An | H04N 21/4126 348/715 |
| 2015/0157838 | A1* | 6/2015 | Gazdzinski | A61B 1/00016 600/3 |
| 2015/0256788 | A1* | 9/2015 | Furihata | H04N 5/7441 348/761 |
| 2016/0227633 | A1* | 8/2016 | Sun | H05B 33/0842 |
| 2016/0227636 | A1* | 8/2016 | Sun | F21K 9/23 |
| 2018/0084627 | A1* | 3/2018 | Recker | H05B 37/0272 |

FOREIGN PATENT DOCUMENTS

| | | |
|---|---|---|
| CN | 104154440 A | 11/2014 |
| CN | 204005389 U | 12/2014 |
| CN | 104315494 A | 1/2015 |

* cited by examiner

SMART LED LIGHTING DEVICE AND SYSTEM THEREOF

CROSS-REFERENCES TO RELATED APPLICATIONS

This application is a national phase entry under 35 USC § 371(c) of PCT Application No. PCT/CN2015/077645, entitled "Smart LED Lighting Device and System Thereof," filed on Apr. 28, 2015, which claims the priority of Chinese Patent Application No. 201410367840.1 filed on Jul. 29, 2014, the entire content of which is incorporated herein by reference.

FIELD OF THE DISCLOSURE

The present disclosure relates to the field of LED lighting technologies and, more particularly, relates to a smart LED lighting device and a smart LED lighting system.

BACKGROUND

LED (Light Emitting Diode) is a solid-state semiconductor device that can directly convert electrical energy to visible light. LED technologies provide many advantages including high energy efficiency, eco-friendliness, controllable lighting, strong viability, high stability, short response time, long lifespan, etc. To promote low carbon living and protect environment, LED technologies have been widely adopted in various lighting applications. LED lighting fits well into the development trend of highly efficient and environmental friendly lighting. Further, LED lighting enables unique power supply and control methods, which allow easy integration of various intelligent controls and multimedia functions.

Existing projection device is often an independent projector. A projector is a projection device used to amplify and display images. Projectors are now widely used for presentations in conference rooms, as well as for watching videos or pictures on a big screen at home by connecting to a DVD player or other media devices. A projector can process data, convert data to optical images, and project images to a screen through a lens. In a smart home environment, projection devices usually exist independently. Further, projection devices require extra battery or power supply from power adapter, and need external connection cables, such as the AV (Audio Video) cable, VGA (Video Graphics Array) cable and HDMI (High Definition Multimedia Interface) cable, to perform movie and video projections. Projection devices not only are large, but also are also costly, which are not suitable for the developing needs of a smart home, or for bringing new smart experience to users.

Therefore, a small, well-designed, compact, stable, cost-efficient, and intelligent smart LED lighting devices and smart LED lighting system integrated with projection functionalities may meet the needs of a smart home.

The disclosed method and system are directed to solve one or more problems set forth above and other problems.

BRIEF SUMMARY OF THE DISCLOSURE

The objective of the present disclosure is to provide a small, aesthetic, compact, integrated with projection functionalities, stable, high cost-efficient smart LED lighting devices and smart LED lighting system that can be integrated into indoor home environment.

One aspect of the present disclosure provides a smart LED lighting device, including an LED light-emitting unit and an LED power supply unit configured to drive the LED light-emitting unit and to provide power supply to the entire smart LED lighting device. The smart LED lighting device further includes a wireless unit, a processor unit and a lens unit which are connected sequentially. The wireless communication unit is configured to receive and transmit video data. The processor unit is configured to analyze and process the video data, produce video data in a projectable format, and transmit the video data to the lens unit. The lens unit is configured to display and project the produced video data to a screen.

Another aspect of the present disclosure provides a smart LED lighting system, including a smart LED lighting device and a smart terminal with wireless communication capabilities. The smart LED lighting device may include an LED light-emitting unit, an LED power supply unit, a wireless unit, a processor unit and a lens unit. The LED power supply unit is configured to drive the LED light-emitting unit and to provide power supply to the entire smart LED lighting device. The wireless communication unit and the smart terminal are wirelessly connected. The smart LED lighting device may receive and transmit video data from the smart terminal. The processor unit is configured to analyze and process the video data, produce video data in a projectable format, and transmit the video data to the lens unit. The lens unit is configured to display and project the produced video data to a screen. Therefore, wireless projection of the video data in the smart terminal can be realized through the smart LED lighting device.

Another aspect of the present disclosure provides another smart LED lighting system, including a smart LED lighting device and a smart terminal with wireless communication capabilities. The smart LED lighting device may include an LED light-emitting unit, an LED power supply unit, a wireless unit, a processor unit and a lens unit. The LED power supply unit is configured to drive the LED light-emitting unit and to provide power supply to the entire smart LED lighting device. The wireless communication unit can be a wireless access point with relay function. The wireless communication unit may wirelessly connect with the Internet. The smart terminal may wirelessly access the Internet by connecting to the wireless access point of the wireless communication unit. The smart LED lighting device may wirelessly receive video data from the smart terminal or the Internet through the wireless communication unit. The processor unit may analyze and process the video data, produce video data in a projectable format, and transmit the video data to the lens unit. The lens unit is configured to display and project the produced video data to a screen. Therefore, wireless projection of the video data from the smart terminal or the Internet can be realized through the smart LED lighting device.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

The present disclosure provides a small, well-designed, compact, stable and highly cost-effective smart LED lighting device and a smart LED lighting system integrated with projection functionalities that can be implemented in an indoor environment. By using a wireless unit to facilitate networking, any connected mobile device can perform local video and image projections. Further, videos and images from the Internet can also be remotely projected and played. Besides projections, the smart LED lighting device can act as a router to provide internet access to any mobile devices that is connected to the network. Embodiments consistent the present disclosure are practical and have a wide range of applications. Further, embodiments consistent with the present disclosure provide enhanced user experiences.

Figure 1:
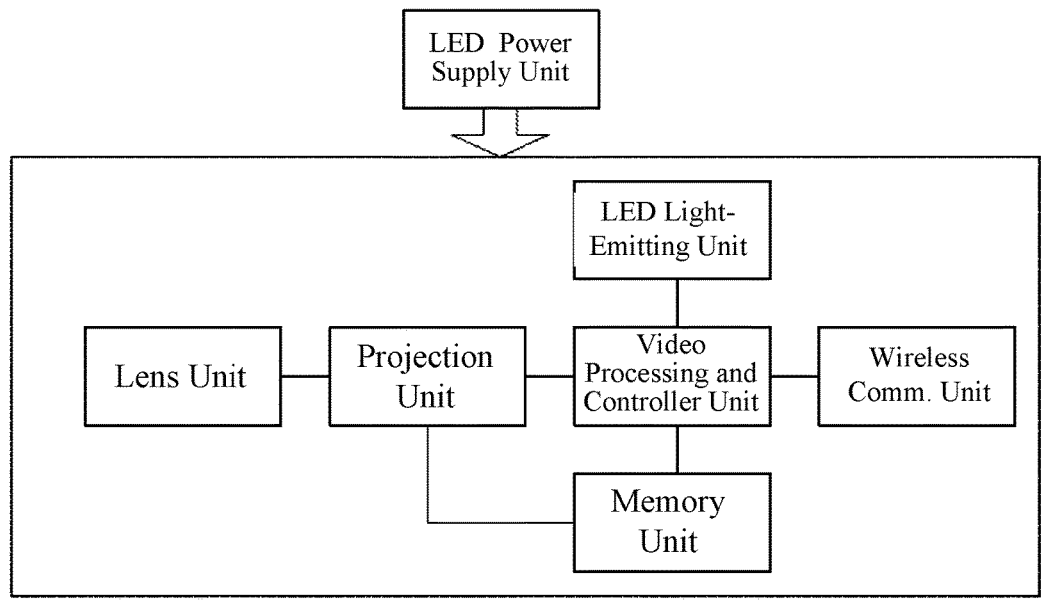
FIG. 1 is a structure diagram illustrating an exemplary smart LED lighting device consistent with the present disclosure.

Specifically, as shown in FIG. 1, the disclosed smart LED lighting device may include an LED light-emitting unit (a first lighting unit), an LED power supply unit, a wireless communication unit, and a processor unit and a lens unit. The LED power supply unit is configured to power the LED light-emitting unit and to provide power supply to the entire smart LED lighting device. The wireless communication unit may receive and transmit video data by a built-in antenna.

The processor unit may include a video processing and controller unit and a projection unit. The video processing and controller unit is configured to receive, analyze and process the video data transmitted from the wireless communication unit, and transmit the processed video data to the projection unit. The projection unit may receive the processed video data from the video processing and controller unit, and transmit to the lens unit. The lens unit is configured to display and project the video data produced by the projection unit to a screen. The lens unit may include a second lighting unit that provides lighting for the projection.

The video processing and controller unit may be integrated on one chip, or may be a video processing chip and a controller chip. Preferably, a memory unit is placed between the video processing and controller unit and the projection unit. The memory unit may be configured as a buffer to store the video data. The projection unit may read the to-be-projected video contents from the memory unit when needed. The operating system of the video processing and controller unit may be Android, LINUX or iOS.

The wireless communication unit may be a radio frequency (RF) unit, a WIFI unit or a Bluetooth unit. In certain embodiments, the wireless communication unit may adopt 2.4G or 5G WI-FI technology, or 2.5G (GPRS), 3G (WCDMA) or 4G (LTE) mobile wireless communication technology.

The screen may be a projection screen fabric that commonly used in offices, a white wall or a wall coated with projection paint. Alternatively, the data may be projected to a retina by retinal image display technologies.

In addition, the smart LED lighting device may further include an audio broadcast module. The audio broadcast module may be a speaker installed inside the smart LED lighting device, or attached on an outer surface of a housing of the smart LED lighting device. When the to-be-projected video data contains audio information, the video processing and controller unit may process and send the audio information to the audio broadcast module for broadcasting.

Figure 2:
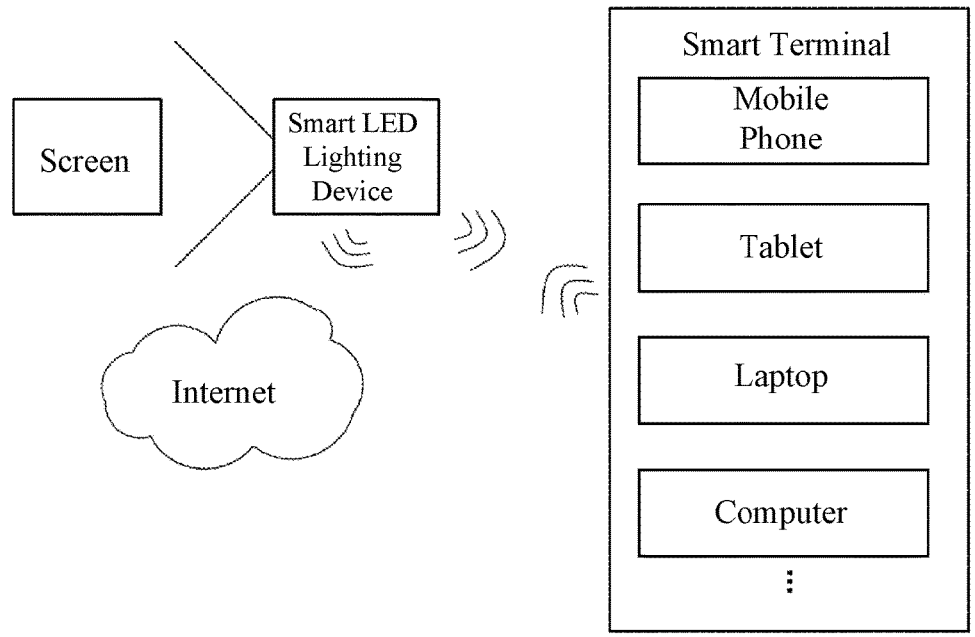
FIG. 2 is a structure diagram illustrating an exemplary smart LED lighting system consistent with the present disclosure.

As shown in FIG. 2, one embodiment of the disclosed smart LED lighting system may include the above-mentioned smart LED lighting device and a smart terminal with wireless communication capabilities. Preferably, the smart terminal may be a tablet computer, a PDA (Personal Digital Assistant), a mobile phone, a laptop computer, a computer, etc. The wireless communication unit of the smart LED lighting device is wirelessly connected to the smart terminal. The smart LED lighting device may wirelessly receive and transmit video data from the smart terminal through the wireless communication unit. Therefore, wireless projection of the video data from the smart terminal can be implemented through the smart LED lighting device.

As shown in FIG. 2, another embodiment of the disclosed smart LED lighting system may include the above-mentioned smart LED lighting device and a smart terminal having wireless communication capabilities. The wireless communication unit of the smart LED lighting device may provide a wireless access point with relay function. The wireless communication unit may wirelessly connect to the Internet. The smart terminal may have wireless access to the Internet by connecting to the wireless access point of the wireless communication unit. The smart LED lighting device may receive video data from the smart terminal or the Internet through the wireless communication unit, and wirelessly project the video data to a screen. Therefore, wireless projection of the video data from the smart terminal or the Internet can be implemented through the smart LED lighting device.

Besides providing LED lighting functions, the disclosed smart LED lighting system may also install an APP (Application) on the smart terminals having a wireless unit and running Android operating system or other operating systems. The APP may connect with the smart LED lighting device and allow Internet surfing or wirelessly projecting contents from the smart terminal or the Internet to a big screen. The APP may provide an interface to control the working status of the smart LED lighting device, including on/off, brightness, color, color temperature, etc. The smart LED lighting system provides a friendly user interface. Besides providing users with projection functions, the smart LED lighting device can also provide online surfing capabilities. Comparing to mobile smart projectors, the disclosed system is not limited by power consumption issues. The disclosed system further provides a relay to the home or office router and expands the wireless network coverage.

Further, in certain embodiments, in a room or office, a plurality of the disclosed smart LED lighting devices may be installed at different locations in the room. The smart LED lighting system may provide two preset projection modes including a presentation mode and a movie mode. For example, when one of the smart LED lighting devices starts to project contents onto a screen, a user may select the presentation mode. One or more smart LED lighting devices with an illumination range covering the side of the screen may be configured to dim automatically. The rest of the smart LED lighting devices with an illumination range covering the audience may be configured to switch on automatically. With such configuration, the audience may see the presenter and the projected presentation slides clearly, while taking notes in a comfortable lighting.

When the movie mode is selected, all the smart LED lighting devices may be automatically switched off to create a theater-like environment. Further, when the smart LED lighting devices are installed with audio broadcast modules, the smart LED lighting system may provide speaker channels to create a theater-like surrounding sound.

Further, users may configure a customized projection mode. In certain embodiments, a user may control the APP installed on the smart terminal to perform the customization. For example, the user may configure the on/off status, brightness, color and color temperature of any individual smart LED lighting device. The user may name and save the customized configuration in the APP for later use.

In certain embodiments, the smart LED lighting device is an LED smart light. The LED smart light may be placed in projections in offices or at home. The installation method and location is not limited. The LED smart light may be installed at any location that requires lighting, such as indoor lighting, industrial lighting, or outdoor lighting.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Comparing to the prior art, the disclosed smart LED lighting device and system thereof provide and integrate an RF unit, a video processing and controller unit, a projection unit and a lens unit into the LED lighting device. The LED lighting device can function as a projector and light. Further, the LED lighting device can be installed at different locations in an indoor environment to deliver the best user experience.

The disclosed smart LED lighting device and system thereof may provide power supply by the power supply unit of the LED lighting device, without requiring extra battery or power adapter. External cables, such as the AV cable, VGA cable or HDMI cable, are not needed either. Further, the system does not require additional work to build fixed wired network. Existing LED assembly holes may be used for installation. Watching movies and videos may be realized by wireless connections.

The disclosed LED lighting device may implement intelligent image analysis technologies, which may achieve higher infrared image resolution than current products on the market, therefore providing more cost-effective infrared thermal imaging.

The disclosed smart LED lighting system uses a wireless unit to facilitate networking. Besides performing projection functions, users may also surf the Internet by using the wireless communication unit of the LED lighting device as a relay wireless access point. The disclosed smart LED lighting system is easy to operate, cost-effective, highly practical and widely applicable, which enhance the user experience.

What is claimed is:
1. A smart LED lighting device, comprising:
an LED light-emitting unit;
an LED power supply unit configured to drive the LED light-emitting unit and to provide power supply to the entire smart LED lighting device;
a wireless unit configured to receive and transmit video data;
a processor unit configured to analyze and process the video data, to produce video data in a projectable format; and
a lens unit configured to receive and project the produced video data onto a screen;
wherein: the wireless communication unit, the processor unit, and the lens unit are connected sequentially within the smart LED lighting device,
and wherein:
the wireless communication unit is a WIFI unit, a Bluetooth unit or a radio frequency (RF) unit;
when the wireless communication unit is an RF unit, the wireless communication unit is configured to adopt 2.4G or 5G WI-FI technologies, or to adopt 2.5G, 3G or 4G mobile wireless communication technologies;
the LED light-emitting unit, the wireless unit, the processor unit that processes the video data, and the lens unit that projects the video data are all powered by the same single LED power supply unit of the smart LED lighting device;
the processor unit includes a video processing and controller unit and a projection unit;
the video processing and controller unit is configured to receive, analyze and process the video data transmitted from the wireless communication unit, and to send the processed video data to the projection unit; and
the projection unit is configured to convert the processed video data from the video processing and controller unit, and to produce video data in a projectable format.
2. The smart LED lighting device according to claim 1, further comprises a memory unit configured to connect the video processing and controller unit and the projection unit, and to buffer and store the video data.
3. The smart LED lighting device according to claim 1, wherein the screen is a projection screen fabric, a white wall, a wall coated with projection paint, or a retina for displaying by retinal image display technologies.
4. The smart LED lighting device according to claim 1, wherein the operating system of the video processing and controller unit is Android, Linux, or iOS.
5. The smart LED lighting device according to claim 1, further comprises:
an audio broadcast module configured to broadcast audio information sent from the video processing and controller unit.
6. The smart LED lighting device according to claim 1, wherein:
the lens unit does not require extra battery, power adapter, or external cable for projection.
7. The smart LED lighting device according to claim 1, wherein:

the wireless communication unit is configured to establish connection with a smart terminal installed with an application program corresponding to the smart LED lighting device;

the application program is configured to facilitate both: projecting the video data from the smart terminal through the processing unit and the lens unit, and controlling a working status of the LED light-emitting unit, the working status includes at least one of an on/off status, a brightness level, a color, or a color temperature of the LED light-emitting unit.

8. The smart LED lighting device according to claim 1, wherein:
the smart LED lighting device is configured to fit a light socket for installation.

9. A smart LED lighting system, comprising:
a smart LED lighting device and a smart terminal with wireless communication capabilities;
wherein the smart LED lighting device comprises:
an LED light-emitting unit;
an LED power supply unit configured to drive the LED light-emitting unit and to provide power supply to the entire smart LED lighting device;
a wireless unit configured to connect with the smart terminal and to receive and transmit video data from the smart terminal;
a processor unit configured to analyze and process the video data, to produce video data in a projectable format, and transmit the video data; and
a lens unit configured to receive and project the produced video data to a screen, allowing wireless projection of the video data from the smart terminal by the smart LED lighting device,
wherein:
the wireless communication unit is a WIFI unit, a Bluetooth unit or a radio frequency (RF) unit;
when the wireless communication unit is an RF unit, the wireless communication unit is configured to adopt 2.4G or 5G WI-FI technologies, or to adopt 2.5G, 3G or 4G mobile wireless communication technologies;
the LED light-emitting unit, the wireless unit, the processor unit that processes the video data, and the lens unit that projects the video data are all powered by the same single LED power supply unit of the smart LED lighting device;
the processor unit includes a video processing and controller unit and a projection unit;
the video processing and controller unit is configured to receive, analyze and process the video data transmitted from the wireless communication unit, and to send the processed video data to the projection unit; and
the projection unit is configured to convert the processed video data from the video processing and controller unit, and to produce video data in a projectable format.

10. The smart LED lighting system according to claim 9, further comprises a memory unit configured to connect the video processing and controller unit and the projection unit, and to buffer and store the video data.

11. The smart LED lighting system according to claim 9, wherein the operating system of the video processing and controller unit is Android, Linux or iOS.

12. A smart LED lighting system, comprising:
a smart LED lighting device and a smart terminal with wireless communication capabilities;
wherein the smart LED lighting device comprises:
an LED light-emitting unit;
an LED power supply unit configured to drive the LED light-emitting unit and to provide power supply to the entire smart LED lighting device;
a wireless unit configured to provide a wireless access point with relay function, to wirelessly connect to the Internet, to enable the smart terminal to wirelessly surf the Internet by connecting to the wireless access point, and to receive and transmit video data from the Internet or the smart terminal;
a processor unit configured to analyze and process the video data, to produce video data in a projectable format, and to transmit the video data; and
a lens unit configured to display and project the produced video data to a screen, allowing wireless projection of the video data from the smart terminal or from the Internet by the smart LED lighting device,
wherein: the LED light-emitting unit, the wireless unit, the processor unit that processes the video data, and the lens unit that projects the video data are all powered by the same single LED power supply unit of the smart LED lighting device;
the processor unit includes a video processing and controller unit and a projection unit;
the video processing and controller unit is configured to receive, analyze and process the video data transmitted from the wireless communication unit, and to send the processed video data to the projection unit; and
the projection unit is configured to convert the processed video data from the video processing and controller unit, and to produce video data in a projectable format.

13. The smart LED lighting system according to claim 12, further comprises a memory unit configured to connect the video processing and controller unit and the projection unit, and to buffer and store the video data.

14. The smart LED lighting system according to claim 12, wherein:
the wireless communication unit is a WIFI unit, a Bluetooth unit or a radio frequency (RF) unit; and
when the wireless communication unit is an RF unit, the wireless communication unit is configured to adopt 2.4G or 5G WI-FI technologies, or to adopt 2.5G, 3G or 4G mobile wireless communication technologies.

15. The smart LED lighting system according to claim 12, wherein:
the screen is a projection screen fabric, a white wall, a wall coated with projection paint, or a retina for displaying by retinal image display technology; and
the smart terminal is a tablet computer, a mobile phone, a laptop computer, or a computer.

16. The smart LED lighting system according to claim 12, wherein the operating system of the video processing and controller unit is Android, Linux or iOS.

17. The smart LED lighting system according to claim 12, wherein:
the smart terminal installs an APP (application);
the APP connects the smart terminal with the smart LED lighting device, allowing the smart terminal to surf the Internet; and
the smart terminal sends the video data to the smart LED lighting device for projection on the screen, the video data being from the smart terminal or from the Internet.

18. The smart LED lighting system according to claim 12, wherein:
the smart LED lighting system includes a plurality of the smart LED lighting devices located at different locations in a room;

a first group of the smart LED lighting devices includes one or more of the smart LED lighting devices with an illumination range covering sides of a projection screen in the room;

a second group of the smart LED lighting devices includes one or more of the smart LED lighting devices with an illumination range covering an audience side of the room;

the smart LED lighting system provides two preset projection modes including a presentation mode and a movie mode;

the presentation mode is configured to dim the first group of the smart LED lighting devices and switch on the second group of the smart LED lighting devices; and the movie mode is configured to automatically switch off all the smart LED lighting devices.

19. The smart LED lighting system according to claim 18, wherein:

the smart LED lighting system provides a customized projection mode, the customized mode including an on/off status, a brightness level, a color and a color temperature for each of the plurality of smart LED lighting devices;

the smart LED lighting system names and stores the customized projection mode for later use.

\* \* \* \* \*